United States Patent [19]

Pontow

[11] Patent Number: 5,354,232
[45] Date of Patent: Oct. 11, 1994

[54] FISH PROCESSING MACHINE

[75] Inventor: Hugo Pontow, Lübeck, Fed. Rep. of Germany

[73] Assignee: Nordischer Maschinenbau Rud. Baader GmbH & Co. KG, Lubeck, Fed. Rep. of Germany

[21] Appl. No.: 124,042

[22] Filed: Sep. 21, 1993

[30] Foreign Application Priority Data

Sep. 23, 1992 [DE] Fed. Rep. of Germany ... 9212788[U]

[51] Int. Cl.$^5$ ............................................. A22C 25/08
[52] U.S. Cl. .................... 452/182; 452/179; 452/180; 193/25 E
[58] Field of Search ................. 452/182, 179, 180; 193/25 R, 25 E, 25 S, 25 C

[56] References Cited

U.S. PATENT DOCUMENTS

| | | | |
|---|---|---|---|
| 4,551,885 | 11/1985 | Molnar | 452/182 |
| 4,613,031 | 9/1986 | Wenzel | 452/179 |
| 4,630,334 | 12/1986 | Evers et al. | 452/182 |
| 4,651,385 | 3/1987 | Persson | 452/179 |
| 5,125,868 | 6/1992 | Persson | 452/182 |
| 5,259,810 | 11/1993 | Evers et al. | 452/182 |

FOREIGN PATENT DOCUMENTS 307830 1/1969 Sweden .................. 452/179

OTHER PUBLICATIONS

BAADER 33 brochure, 1967.
BAADER 32 brochure, 1989.

*Primary Examiner*—Willis Little
*Attorney, Agent, or Firm*—Fay, Sharpe, Beall, Fagan, Minnich & McKee

[57] ABSTRACT

There is described a fish processing apparatus, which comprises a first processing section, inside which the fish are conveyed in a direction transverse to their longitudinal axes and a second processing section, adjoining the first section at an angle to it, inside which the fish are conveyed lengthways. At the end portion of the first processing section there is installed an auxiliary device for the transfer of fish to the second processing section, with a cover located above the path of the fish which is formed to be resiliently displaceable in the intake region and non-yielding in the region the outlet portion. Thereby, a transfer combining correct alignment and exact timing is achieved as a prerequisite for precise processing with an increased yield at a high throughput.

18 Claims, 1 Drawing Sheet

FISH PROCESSING MACHINE

BACKGROUND OF THE INVENTION

1. Field of the Invention

The invention concerns a fish processing machine, which comprises: a first processing section, inside which the fish are conveyed in a direction transverse to their longitudinal axes, for the purpose of severing the heads and/or tails, for example; a transfer station, at an end portion of said first processing section, with a cover arranged above the path of the fish, and extending essentially vertically at its outlet side; and a second processing section adjoined at an angle to said first section e.g. for gutting and or filleting, inside which second section the fish are conveyed in the longitudinal direction.

2. Prior Art

Machines of this type have been used in practice for a long time and thus form part of the prior art, which is available as printed matter as well as in the form of the applicant's brochures, e.g. under the reference type BAADER 33 from March 1967 and BAADER 32 from May 1989.

The machines of the type described in these brochures comprise a cover in the transfer region between the first and second processing sections, which cover consists of a covering grid, equipped with grid bars running in the direction of movement of the conveyor in the first processing section. The covering grid encloses the path of the fish in the deflection region of the conveyor which turns over an angle of deflection of about 90° and is arranged to have a distance to the conveyor surface which decreases from the intake to the outlet end, with an average dimension approximately corresponding to the thickness of an average fish to be processed. The covering grid is pivotable about an axis running transverse to the grid bars at the intake portion and is arranged to be displaceable against the force of a spring by the fish. It terminates over a collection channel, at the base of which is located a conveyer which receives the fish in a swimming position.

With these machines, there is a critical handling phase during the processing of the fish in the covered region, that is in the moment of transfer from the sideways to the lengthwise conveying of the fish. The resulting irregularities are caused by the fact that during a short period, each fish is not forceably conveyed, but rather the completion of transfer is left to gravity. However, this leads to the appearance of positioning errors and timing inaccuracies on transfer which are due to the naturally occurring, widely different properties of the fish that are to be processed in succession, like size, consistency, nature of the surface etc., which errors and inaccuracies influence the precision of the processing and thus adversely affect the performance.

This unsatisfactory operation is also caused by the fact that during the conveyance in the turning region, the fish come into contact with the covering grid plate and displace it, while being held against the supporting surface by the corresponding spring force. In this way, a first error can already occur in that the fish have a tendency to twist due to the braking effect they experience which is caused by the contact of the covering grid on their outer flanks. At the end of the covering grid, that is at the moment when the fish are released, the spring force also impedes the start of the free fall, which can lead to differing fall times and incorrect positioning of the fish on transfer. A third source of error is the effect of centrifugal force during deflection, which can cause an excessive displacement by the covering grid and which leads to such a deviation of the grid, particularly at the discharge region thereof, that the fish strike the side wall of the collection channel and thus are further impeded. This effect can be influenced by increasing the strength of the downward force of the covering grid, but then the first mentioned errors come increasingly into effect.

The above described faults also have the effect that the exact timing in the first processing section is in part so distorted that in the second processing section, tools whose operation is linked to the timing produce imprecise results.

3. Objects of the Invention

It is the main object of the present invention to eliminate the above drawbacks.

It is a particular object of the present invention to improve the conveyance of fish through a deflection area in which their direction of travel and orientation changes whilst they are transferred from one conveyor to another.

SUMMARY OF THE INVENTION

It has surprisingly been found that these objects can be achieved in a very simple way in a processing machine comprising a first processing section, inside which the fish are conveyed in a direction transverse to their longitudinal axes, a transfer station at an end portion of said first processing section with a cover arranged above the path of the fish and extending essentially vertically at its outlet side and a second processing section adjoined at an angle to said first section, inside which second section the fish are conveyed in the longitudinal direction, by making the covering grid resiliently yielding at its intake portion relative to the path of the fish and stationary, i.e. non-yielding at its outlet portion, and by providing a spacing between the grid and the fish support surface which, at the intake side, is smaller than the thickness of the smallest fish specified for processing and at the outlet side, is larger than the thickness of the correspondingly largest fish.

The resulting advantages are, in particular, that the fish are transferred to the greatest possible extent without disruptive interference i.e., correctly positioned and accurate with respect to timing, so that precise processing with a correspondingly improved yield with a high throughput is possible.

According to a particularly simple embodiment of the invention, the cover can be pivotably mounted at its outlet end, on a pivot axis running adjacent and essentially parallel to the fish path in the second processing section. A grid-like form of cover with the grid bars running substantially parallel to the path of the fish in the first processing section has the advantage that the position of the fish with respect to their longitudinal axes can be maintained; this can also be achieved by providing the cover in the form of a plate with web-like elevations on its inner surface which faces the fish path.

According to a preferred further embodiment, the outlet side of the cover can terminate above a channel-shaped collection device, having a conveyor located at its base, such that the guiding inner surface of the cover either forms the side barrier of the collection device or adjoins a separate barrier.

BRIEF DESCRIPTION OF THE DRAWINGS

Other and further objects of the present invention will be apparent from the following description and claims and are illustrated in the accompanying drawings which by way of illustration schematically show preferred embodiments of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims.

In the drawings

DETAILED DESCRIPTION OF PREFERRED EMBODIMENTS OF THE INVENTION

Figure 1:
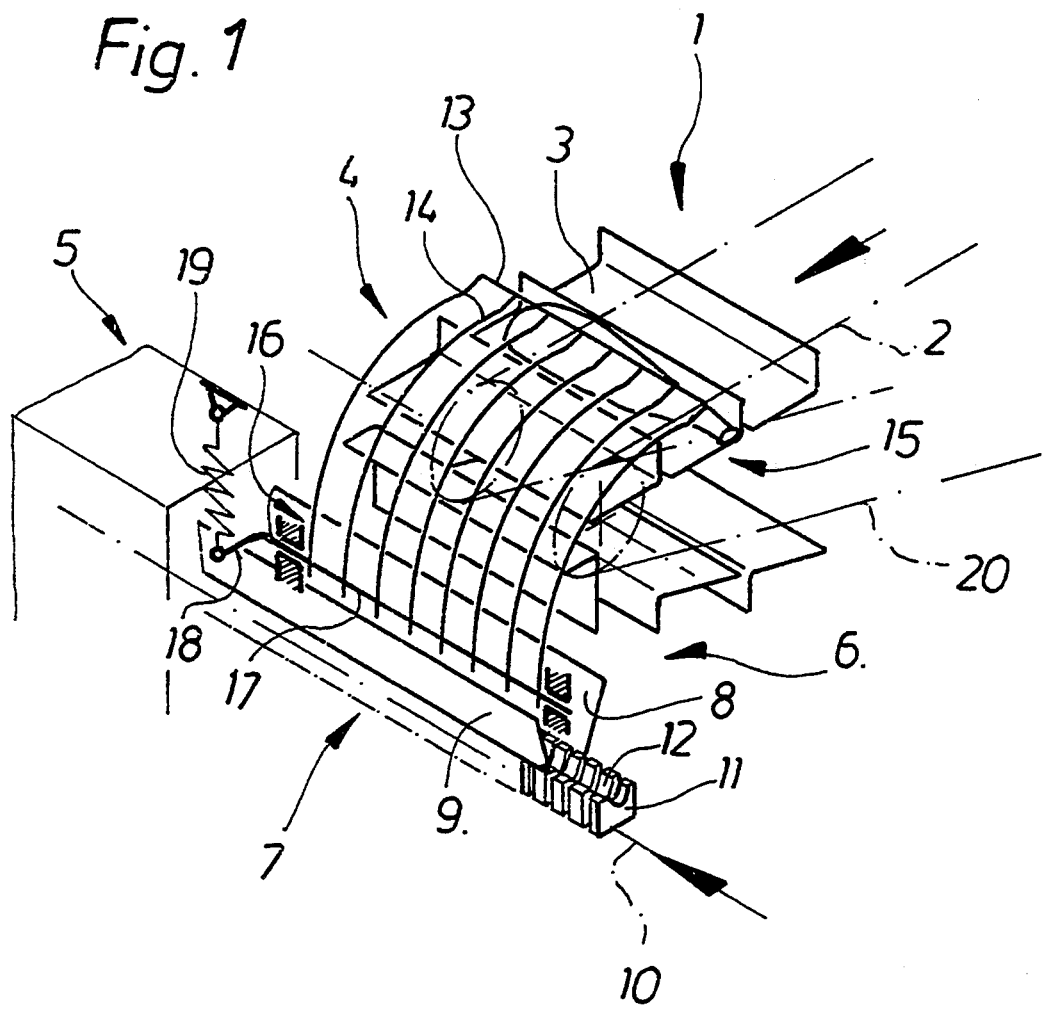
FIG. 1 shows a simplified representation of a partial axonometric view of a transfer station between two processing sections of a fish processing machine arranged at an angle to one another.
Figure 2:
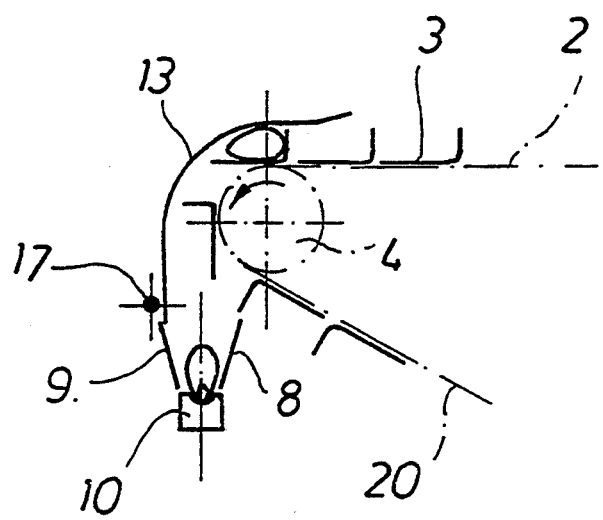
FIG. 2 shows a simplified representation of a side view of the transfer station.

The fish processing machine forming the basis for the following description of invention is formed with an angled structure and performs for example the processing of fish by decapitating, gutting and filleting. A machine of this type comprises a first processing section 1 with a driven conveyor 2 having troughs 3, in which the fish are held lying on their sides, uniformly aligned with respect to the position of the heads/tails and stomachs/backs. After having been correctly positioned for processing in a known manner, the fish are conveyed through the operation areas of the processing tools which are not shown, in a direction transverse to their longitudinal axes. The conveyor 3 is endless and is guided around deflecting means, the outlet side deflector 4 being represented in the figures.

Adjoining the first processing section 1 there is provided a second processing section 5, arranged at a lower level than the first section 1 and at an angle to it, in which the fish are conveyed in the direction of their longitudinal axes and in which they can be processed by means of processing tools which are not shown. The connection between both processing sections 1 and 5 is defined by a transfer station 6, in which the fish are transferred from lengthways to sideways transport. This is achieved by casting the fish from the troughs 3 into the collection device 7, which conducts the fish to the second processing section 5. The collection device 7 is channel shaped and comprises inner and outer lateral side barriers, 8 and 9, respectively, which are arranged facing one another in a V-shape. At its base it is provided with a driven conveyor 10. This preferably comprises an endless chain having chain links 11, which are formed with appropriately shaped recesses, preferably prism shaped, so that a channel is formed running in the direction of movement. The collection device 7 is arranged in such a way with respect to the first processing section 1, that after being cast from the troughs 3, the fish land between the barriers 8 and 9 with their belly edges on the recessed chain links 11, so that they are conveyed to the second processing section 5 in a swimming position.

For the purpose of guiding the fish in the region of the transfer station 6, there is provided a cover 13, arranged above the path of the troughs 3. This comprises grid bars 14, running parallel to the path of the fish in the first processing section 1 which, starting upstream of the deflector 4, terminate directly above the outer barrier (9) of the collection device 7 and curve according to the path of the troughs 3. At the intake end 15, the grid bars 14 are skid-shaped, i.e. curved upwards, and run from the intake end to the outlet end 16 with an increasing spacing from the path of the troughs. The cover 13 is pivotably mounted at the outlet end 16 on an integrated pivot axis 17, which extends in a direction parallel to the path of the fish in the second processing section 5. The pivot axis 17 is provided with a crank lever 18, which is engaged by a tension spring 19 for causing an elastic swivelling of the cover 13 towards the path of the troughs 3. The rest position of the cover can be determined by a stop which is not shown.

In the drawings, the cover 13 is shown as a grid structure, but one can readily imagine it to be formed as a continuous curved plate or sheet, having web-shaped elevations formed on the inner surface opposing the troughs and arranged in a manner similar to the grid bars 14.

In the operation of the device, the cover is positioned and set such that in the deflecting region, the shoulders of the troughs 3 which push the fish from behind, lightly touch and press against the inner surface of the cover 13 to displace it. The fish which project above the shoulders of the troughs 3 will come into contact with the inner surface of the cover and displace it. On passing round the deflector 4, in which region the spacing between the cover 13 and the path of the troughs 3 increases, the fish are finally able to slide unimpeded out of the troughs 3 when the latter pass on to the return run 20 of the conveyor 2, i.e. when the troughs are guided out of the path of the falling fish.

In this way, it is possible to effect a transfer which maintains and respects the timing and the alignment of the fish to a high degree, even though the fish rely only on the force of gravity over a certain distance. The precision is so great, that measurements taken from a fish while it is passing through the first processing section 1 and values gathered therefrom can be used in the direct control of processes which are to be carried out in the second processing section 5.

LIST OF REFERENCE NUMERALS

1. First processing section
2. Conveyor
3. Trough
4. Outlet side deflector
5. Second processing section
6. Transfer station
7. Collection device
8. Inner barrier
9. Outer barrier
10. Conveyor
11. Chain link
12. Channel
13. Cover
14. Grid bar
15. Intake end
16. Outlet end
17. Pivot axis
18. Crank
19. Tension spring
20. Return run

I claim:

1. An apparatus for processing fish, said fish defining a longitudinal axis and having a thickness according to which a smallest and a largest of said fish to be processed are defined, said apparatus comprising:
   a) a first processing section, which has an end portion and defines fish supporting surface means and a first fish path section along which said fish are conveyed on said fish supporting surface means in a direction essentially transverse to said longitudinal axes towards said end portion;
   b) a transfer station located at said end portion of said first processing section and including cover means arranged above said first fish path section, said cover means having an intake portion and an outlet portion and defining guiding inner surface means directed towards said first fish path section, said outlet portion of said cover means extending essentially vertically;
   c) a second processing section adjoined at an angle to said first processing section and defining a second fish path section along which the fish are conveyed in a direction essentially parallel to said longitudinal axis;

wherein said cover means are formed to be resiliently yielding with respect to said first fish path section at said intake portion, and non-yielding with respect to said first fish path section at said outlet portion, the distance of said cover means from said fish supporting surface means being, at the intake portion, smaller than the thickness of said smallest fish specified for processing and, at said outlet portion, larger than the thickness of said largest fish specified for processing.

2. An apparatus for processing fish as claimed in claim 1, wherein pivot axis means are located at said outlet portion and extend adjacent and substantially parallel to said second fish path section, said cover means being pivotably mounted on said pivot axis means.

3. An apparatus for processing fish as claimed in claim 2, wherein channel shaped collection device means are arranged adjacent said outlet portion and said cover means terminate above said collection device means, said collection device means defining a base and including conveyor means situated at said base and outer lateral barrier means, said guiding inner surface means of said cover means being integrally formed with said outer lateral barrier means.

4. An apparatus for processing fish as claimed in claim 2, wherein channel shaped collection device means are arranged adjacent said outlet portion and said cover means terminate above said collection device means, said collection device means defining a base and including conveyor means situated at said base and outer lateral barrier means, said guiding inner surface means of said cover means adjoining said outer lateral barrier means and being separate therefrom.

5. An apparatus for processing fish as claimed in claim 1, wherein said cover means has a grating structure with grating bars extending substantially parallel to said first fish path section.

6. An apparatus for processing fish as claimed in claim 5, wherein channel shaped collection device means are arranged adjacent said outlet portion and said cover means terminate above said collection device means, said collection device means defining a base and including conveyor means situated at said base and outer lateral barrier means, said guiding inner surface means of said cover means being integrally formed with said outer lateral barrier means.

7. An apparatus for processing fish as claimed in claim 5, wherein channel shaped collection device means are arranged adjacent said outlet portion and said cover means terminate above said collection device means, said collection device means defining a base and including conveyor means situated at said base and outer lateral barrier means, said guiding inner surface means of said cover means adjoining said outer lateral barrier means and being separate therefrom.

8. An apparatus for processing fish as claimed in claim 2, wherein said cover means has a grating structure with grating bars extending substantially parallel to said first fish path section.

9. An apparatus for processing fish as claimed in claim 8, wherein channel shaped collection device means are arranged adjacent said outlet portion and said cover means terminate above said collection device means, said collection device means defining a base and including conveyor means situated at said base and outer lateral barrier means, said guiding inner surface means of said cover means being integrally formed with said outer lateral barrier means.

10. An apparatus for processing fish as claimed in claim 8, wherein channel shaped collection device means are arranged adjacent said outlet portion and said cover means terminate above said collection device means, said collection device means defining a base and including conveyor means situated at said base and outer lateral barrier means, said guiding inner surface means of said cover means adjoining said outer lateral barrier means and being separate therefrom.

11. An apparatus for processing fish as claimed in claim 1, wherein said guiding inner surface means are provided with web-like elevations, directed towards said first fish path section.

12. An apparatus for processing fish as claimed in claim 11, wherein channel shaped collection device means are arranged adjacent said outlet portion and said cover means terminate above said collection device means, said collection device means defining a base and including conveyor means situated at said base and outer lateral barrier means, said guiding inner surface means of said cover means being integrally formed with said outer lateral barrier means.

13. An apparatus for processing fish as claimed in claim 11, wherein channel shaped collection device means are arranged adjacent said outlet portion and said cover means terminate above said collection device means, said collection device means defining a base and including conveyor means situated at said base and outer lateral barrier means, said guiding inner surface means of said cover means adjoining said outer lateral barrier means and being separate therefrom.

14. An apparatus for processing fish as claimed in claim 2, wherein said guiding inner surface means are provided with web-like elevations, directed towards said first fish path section.

15. An apparatus for processing fish as claimed in claim 14, wherein channel shaped collection device means are arranged adjacent said outlet portion and said cover means terminate above said collection device means, said collection device means defining a base and including conveyor means situated at said base and outer lateral barrier means, said guiding inner surface means of said cover means being integrally formed with said outer lateral barrier means.

16. An apparatus for processing fish as claimed in claim 14, wherein channel shaped collection device means are arranged adjacent said outlet portion and said cover means terminate above said collection device means, said collection device means defining a base and including conveyor means situated at said base and outer lateral barrier means, said guiding inner surface means of said cover means adjoining said outer lateral barrier means and being separate therefrom.

17. An apparatus for processing fish as claimed in claim 1, wherein channel shaped collection device means are arranged adjacent said outlet portion and said cover means terminate above said collection device means, said collection device means defining a base and including conveyor means situated at said base and outer lateral barrier means, said guiding inner surface means of said cover means being integrally formed with said outer lateral barrier means.

18. An apparatus for processing fish as claimed in claim 1, wherein channel shaped collection device means are arranged adjacent said outlet portion and said cover means terminate above said collection device means, said collection device means defining a base and including conveyor means situated at said base and outer lateral barrier means, said guiding inner surface means of said cover means adjoining said outer lateral barrier means and being separate therefrom.

* * * * *